United States Patent
Kumar et al.

(10) Patent No.: US 8,818,713 B2
(45) Date of Patent: Aug. 26, 2014

(54) SYSTEM AND APPARATUS PROVIDING LOCALIZED EVACUATION GUIDANCE

(75) Inventors: Nukala Sateesh Kumar, Bangalore (IN); Arunkumar Kamalakannan, Chennai (IN)

(73) Assignee: Honeywell International Inc., Morristown, NJ (US)

( * ) Notice: Subject to any disclaimer, the term of this patent is extended or adjusted under 35 U.S.C. 154(b) by 350 days.

(21) Appl. No.: 13/186,518

(22) Filed: Jul. 20, 2011

(65) Prior Publication Data
US 2013/0024106 A1    Jan. 24, 2013

(51) Int. Cl.
*G01C 21/34* (2006.01)
(52) U.S. Cl.
USPC ............... 701/423; 701/468; 701/533
(58) Field of Classification Search
USPC ......... 701/423, 422, 410, 468, 454, 450, 451, 701/533; 340/517, 532, 539.11, 539.13, 340/601
See application file for complete search history.

(56) References Cited

U.S. PATENT DOCUMENTS

| | | | |
|---|---|---|---|
| 5,682,142 A * | 10/1997 | Loosmore et al. | 340/572.1 |
| 7,349,768 B2 | 3/2008 | Bruce et al. | |
| 2007/0049259 A1 | 3/2007 | Onishi et al. | |
| 2008/0090599 A1 * | 4/2008 | Patel et al. | 455/466 |
| 2009/0138353 A1 | 5/2009 | Mendelson | |
| 2011/0115623 A1 | 5/2011 | Gnanasekaran et al. | |
| 2012/0075112 A1 * | 3/2012 | Sundholm | 340/691.6 |
| 2012/0112901 A1 * | 5/2012 | Chasko | 340/517 |
| 2012/0150755 A1 | 6/2012 | Kumar et al. | |
| 2012/0179361 A1 * | 7/2012 | Mineta et al. | 701/410 |

* cited by examiner

*Primary Examiner* — Richard Camby
(74) *Attorney, Agent, or Firm* — Husch Blackwell LLP

(57) ABSTRACT

A method and apparatus for detecting hazardous gases. The method includes the steps of providing a central station and a plurality of environmental detectors within a protected area, each of the plurality of environmental detectors detecting environmental events within the protected area and reporting detected events to the central station, one of the plurality of environmental detectors detecting an environmental event within the protected area and reporting that event to the central station, the central station determining a location of the detected event and of each of the plurality of environmental detectors within the protected area, the central station dynamically computing a route from the determined location of each of the plurality of environmental detectors to the closest and safest exit based upon the determined location of the detected environmental event and the central station generating and sending a respective map showing the computed route to the closest and safest exit for that environmental detector to each of the plurality of environmental detectors.

17 Claims, 6 Drawing Sheets

SYSTEM AND APPARATUS PROVIDING LOCALIZED EVACUATION GUIDANCE

FIELD

The field relates to gas detectors and more particularly to methods of evacuating hazardous areas.

BACKGROUND

Gas detectors are generally known. Such devices may be fixed or portable and may be used in the home setting to detect natural gas leaks or in an industrial setting to detect natural gas or other hazardous gases.

In the industrial setting, hazardous gases may represent a threat on any of a number of different levels. On one level, the gas may be explosive above certain concentrations. Alternatively, the gas may be toxic above certain concentrations when inhaled by any person in the area. On still another level, the gas may be a product of combustion that is either toxic or that suggests an imminent threat of explosion or fire.

In order to ensure the overall safety of a facility, gas detectors are often required wherever people are present. Each of the detectors may include or be associated with local visual or audible alarms to alert a user and nearby persons to threats.

In many facilities, gas detectors (both fixed and portable) are distributed throughout the facility and connected to a central monitoring station. In the event that a threat is detected by one station, a general alarm may be sounded throughout the facility to evacuate the facility.

In other, larger facilities, it may not be possible to evacuate the entire facility. In these cases, the gas detectors may be segregated into zones based upon geographic location or risk. In these cases, the detection of a threat in any one area may only require the evacuation of the affected zone.

While such centralized systems work well, it is often difficult to coordinate evacuations of people away from the threat. A public address system may be needed, but such systems may not work or could become damaged. Accordingly, better methods are needed to coordinate evacuations in such situations.

DETAILED DESCRIPTION OF AN ILLUSTRATED EMBODIMENT

Figure 1:
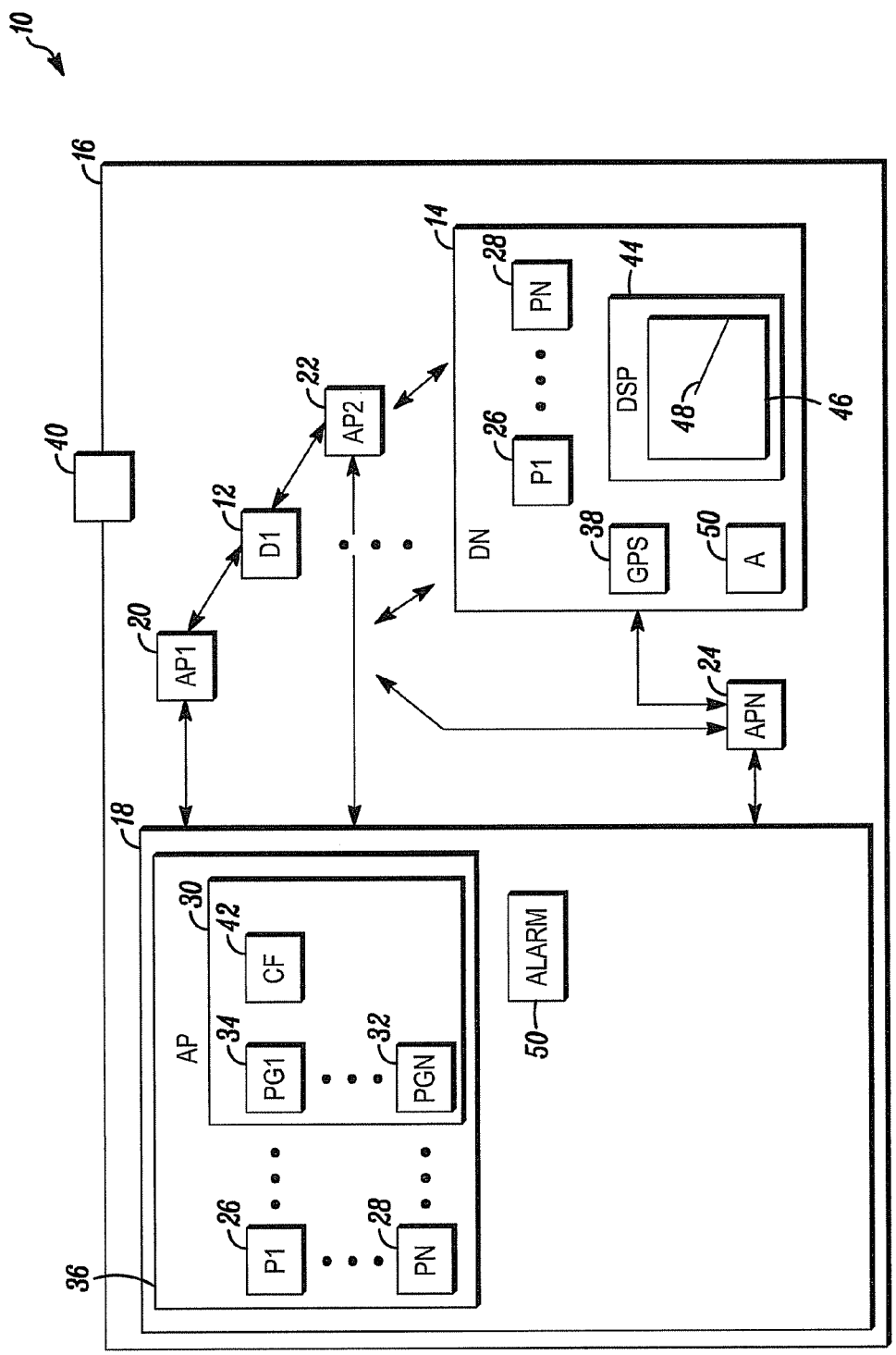
FIG. 1 is a block diagram of a gas monitoring system shown generally in accordance with one embodiment.

FIG. 1 is a block diagram of a gas monitoring system 10 shown generally in accordance with one illustrated embodiment. Included within the system 10 is a number of portable gas detectors 12, 14 that monitor for hazardous gases within a protected area 16. The portable gas detectors 12, 14 may be lightweight devices adapted to be carried by and attached to the clothing of persons working within the protected area 16.

Also included within the protected area 16 may be a central station 18. The central station 18 may monitor the portable gas detectors 12, 14 via one or more wireless access point devices 20, 22, 24 under an appropriate communication protocol (e.g., WiFi, Bluetooth, etc.).

The portable gas detectors 12, 14 may be constructed to detect and/or measure any one of a number of different types of hazardous gases (e.g., natural gas, carbon monoxide, etc.) using an appropriate technology (e.g., catalyst, electrochemical reaction, etc.). The portable gas detectors 12, 14 may periodically report the measured levels to the central station 18 via one or more of the access points 20, 22, 24. The central station 18 may initiate a general or limited evacuation of the protected area 16 via one or more audio or audio and visual alarm devices 50. The central station 18 may also download a respective indication of an evacuation route (e.g., a map with an evacuation route shown thereon) to each of the portable gas detectors 12, 14.

The central station 18 may include an gas information processing system 36 that processes information from the gas detectors 12, 14. Included within the gas information processing system 36 (and also within each of the gas detectors 12, 14) may be one or more central processing units (processors) 26, 28 programmed with (and operating under the control of) one or more computer programs 32, 34 loaded from a non-transitory computer readable medium (memory) 30.

In this regard, a communication processor 26, 28 may periodically poll each of the gas detectors 12, 14, in real time, for gas readings. The communication processor 26, 28 may poll each of the gas detectors 12, 14 by composing and wirelessly sending a respective information request to a system address of the gas detector 12, 14.

During normal operation, a monitoring processor 26, 28 within the gas detectors 12, 14 may periodically retrieve a then current gas concentration reading from a gas sensor within the detector 12, 14. In response to the polling messages, the monitoring processors 26, 28 may compose and send messages, addressed to the communication processor, including at least the gas reading and a system address of the respective detectors 12, 14. Upon receipt of the gas reading, the communication processor 26, 28 may pass the gas reading and identifier of the gas detector 12, 14 to an alarm processor 26, 28 within the processing system 36 for further processing.

Within the alarm processor 26, 28, the gas reading may be compared with one or more threshold values. If the readings exceed the threshold values, the alarm processor 26, 28 may generate an alarm.

Alternatively, an alarm processor 26, 28 may be located within at least some of the gas detectors 12, 14. In this case, the alarm processor 26, 28 may compare the gas readings, locally, with the appropriate threshold values and simply send the alarm message to a corresponding alarm processor 26, 28 within the gas information processing system 36.

In order to facilitate a response to the detection of a gas reading above a threshold value, the central station 18 may operate to determine a location of any gas detector 12, 14 providing an alarm message or a gas reading resulting in an alarm message (i.e., the alarm initiating gas detector). In this regard, a localizing processor 26, 28 within the processing system 36 may operate to determine a location of the gas detector 12, 14 that initiates the alarm. In this regard, the localizing processor 26, 28 may retrieve a system identifier of the gas detector 12, 14 providing the alarm from the alarm processor 26, 28 and determine a location of the initiating detector 12, 14 from the identifier.

The localizing processor may determine a location of the initiating gas detector 12, 14 using any of a number of different methods. Under a first method, the localizing processor may send a message requiring a response from the initiating gas detector 12, 14 and measure a signal strength of the response received through at least three access points 20, 22, 24 proximate the initiating gas detector 12, 14. The localizing processor 26, 28 may then determine a precise location of the initiating gas detector 26, 28 by triangulating the location from the signal strength readings. This process is based upon the assumption of a constant signal attenuation per unit of distance from the initiating gas detector 12, 14 to each of the access points 20, 22, 24. By triangulating the signal strengths, the localizing processor 26, 28 may determine a location (e.g., a latitude and longitude) of the initiating gas detector 12, 14.

Alternatively, some or all of the gas detectors 12, 14 may be provided with a GPS receiver 38. In this case, the signal from the localizing processor 26, 28 may be a location request for information from the GPS receiver 38. In response, the initiating gas detector 12, 14 responds with a set of coordinates (latitude and longitude) of the initiating gas detector 12, 14.

Upon receiving the location of the initiating gas detector 12, 14, the localizing processor 26, 28 may determine a location of the threat. If there is only a single initiating gas detector 12, 14 (i.e., only one gas detector has reported a gas reading above the threshold), then the location of the threat may be assumed to be the location of the single initiating gas detector 12, 14. If more than one gas detector 12, 14 is reporting a reading above the threshold, then some other method (e.g., finding a center point between the initiating gas detectors) may be used to determine a location of the threat.

Upon determining a location of the threat, a routing processor 26, 28 may determine closest and safest routes to the closest exit 40. The routing processor 26, 28 may first determine a safest and closest exit 46 by retrieving the coordinates of each exit 40 of the protected area 16 from a coordinates file 42 and calculating a distance from the location of the initiating gas detector 12, 14 to each exit 40. If two exits 40 are equidistant from the initiating gas detector 12, 14 and if the path to a first of the two exits crosses the area of the threat, then the second exit is identified as the closest and safest exit 40.

Upon identifying the closest and safest exit 40, the routing processor 26, 28 may retrieve a map 46 of the protected area 16 and superimpose the identified closest and safest route 48 onto the map. The map 48 may then be downloaded and shown on a display 44 of the initiating gas detector 12, 14.

A similar process may be used for each of the other gas detectors 12, 14 operating within the protected area 16. In each case, the localizing processor 26, 28 may first determine a location of the gas detector 12, 14 as discussed above. A closest and safest route from the gas detector 12, 14 to the nearest exit 40 for that gas detector 12, 14 may then be calculated and identified by reference to the location of the threat as also discussed above. A map is then downloaded to the gas detector 12, 14 with the identified route superimposed on the map. The map is shown on a display 44 of the gas detector 12, 14.

Figure 2:
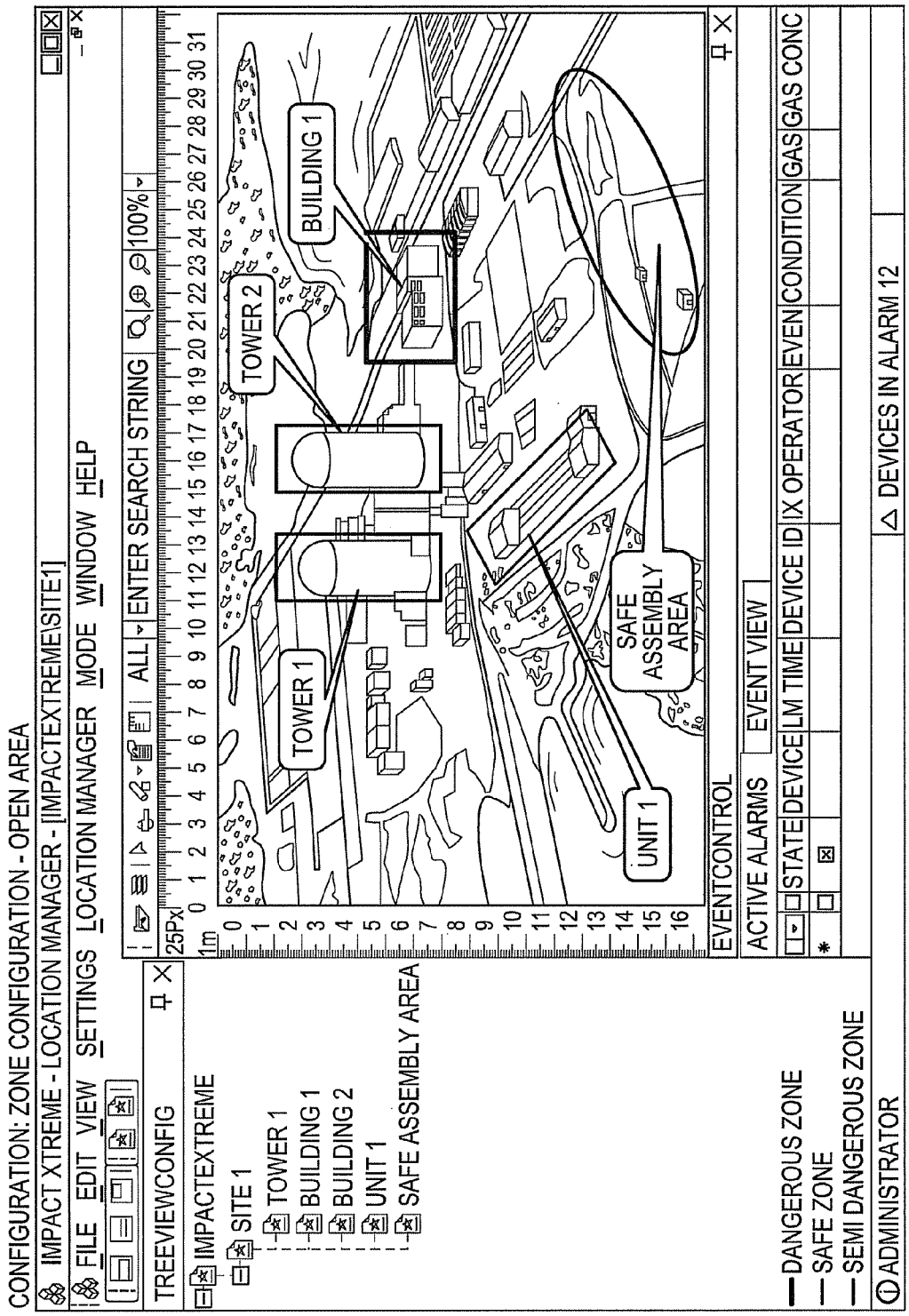
FIG. 2 is an example of a map for an open area that may be used by the system of FIG. 1.

FIG. 2 depicts a map of protected area 16 encompassing an open area. In this case, the areas shown surrounded by boxes define separate alarm zones. Another area surrounded by a oblong line defines a safe area (i.e., an exit) where people are to be routed in the event of an emergency.

Figure 3:
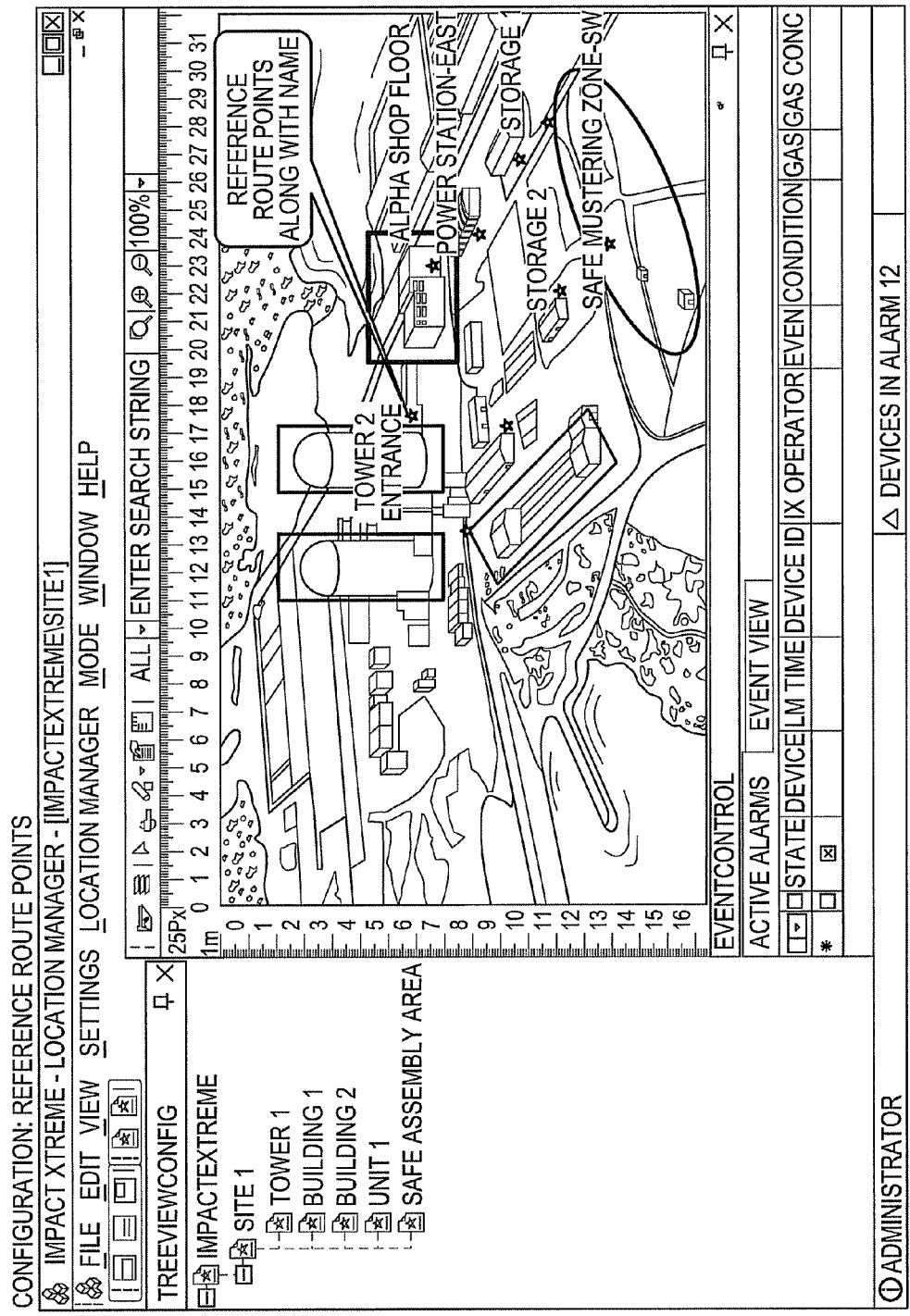
FIG. 3 depicts the map of FIG. 2 with reference sub-exits along a path to a safe area.

FIG. 3 depicts the map of FIG. 2, but with reference points (shown as stars) along possible evacuation routes. In this case, the stars define sub-exits that may be used by the routing processor 26, 28 to form a portion of a route to the closest and safest exit (i.e., the safe mustering zone—SW).

Figure 4:
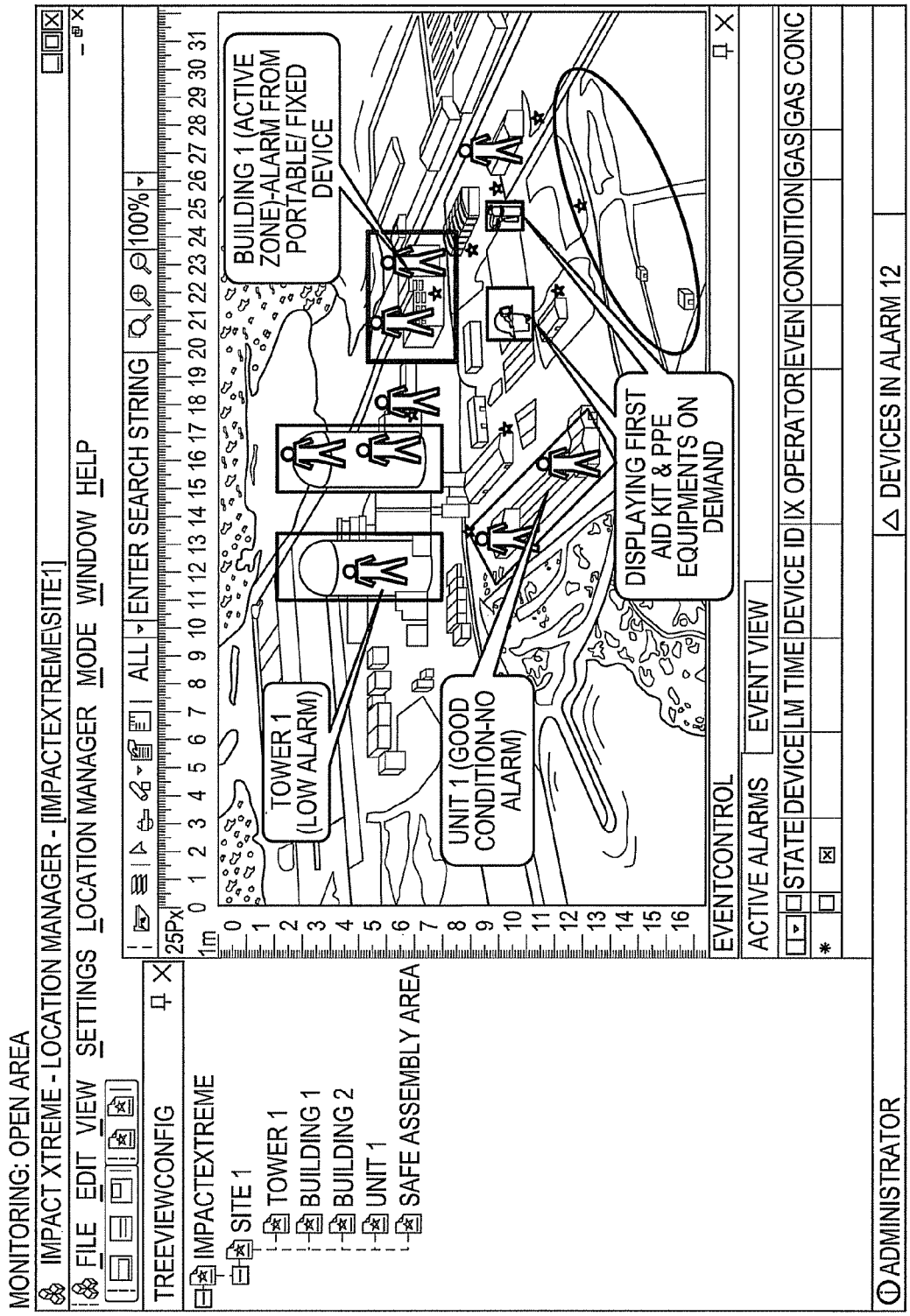
FIG. 4 depicts the map of FIG. 2 with exemplary alarm conditions.

FIG. 4 shows a low alarm in the zone labeled Tower 1. The low alarm may be defined by a gas concentration above a lower threshold level. Another zone (Building 1) has a higher level of alarm. FIG. 4 also shows first aid kits and personnel protection equipment (respirators) located along some of the possible evacuation routes.

Figure 5:
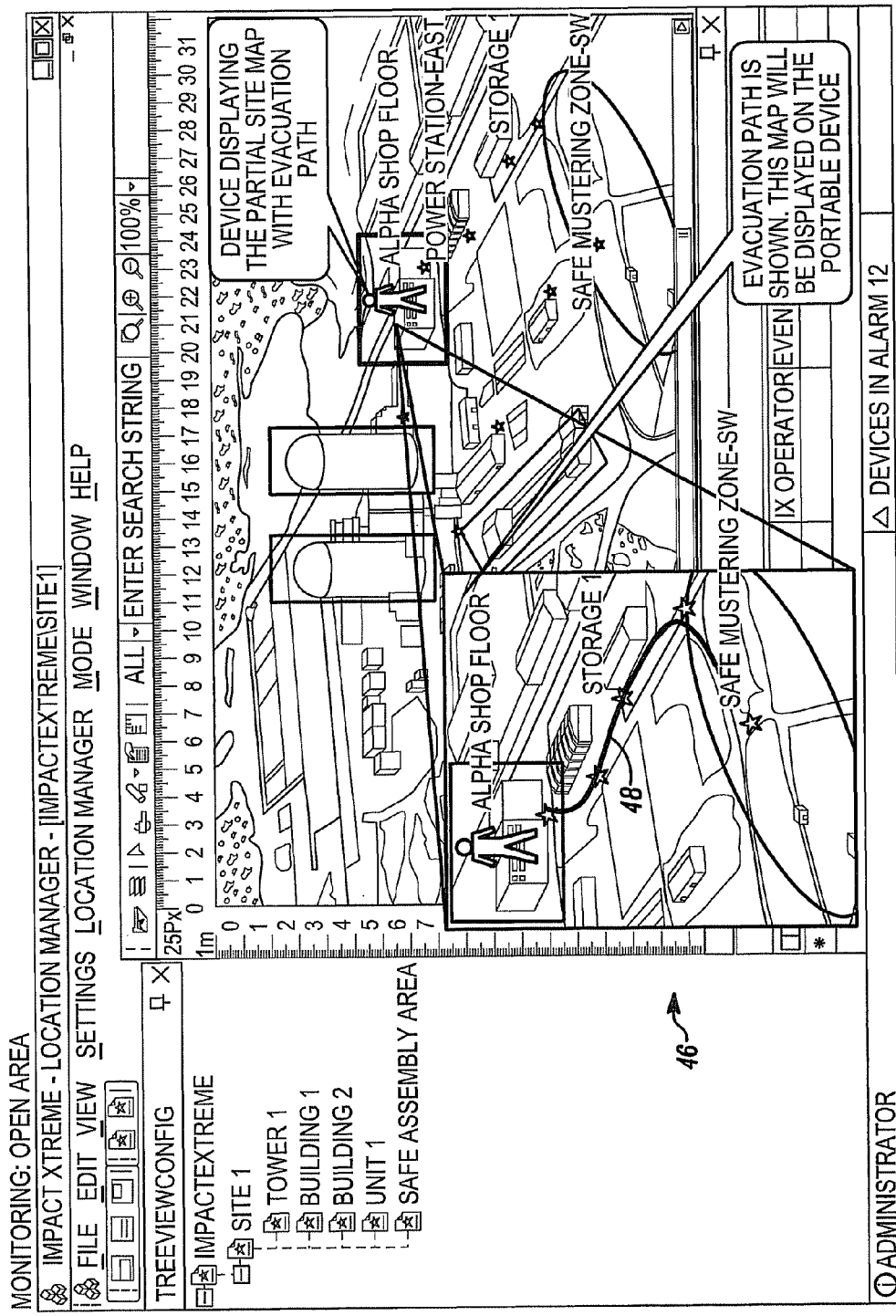
FIG. 5 depicts the map of FIG. 2 along with an evacuation route.

FIG. 5 shows a map 46 with route 48 calculated by the routing processor 26, 28. In this case, the routing processor 26, 28 constructed the route 48 piecemeal from the zone with the highest level of alarm (i.e., Building 1) to the exit (i.e., safe mustering zone—SW). As a first step, the routing processor 26, 28 identifies the closest sub-exits. One sub-exit leads towards the zone labeled Tower 2. However, Tower 2 is shown in FIG. 4 to lead towards a low level alarm and is discarded. The second sub-exit is shown in FIG. 5 to lead towards the sub-exit labeled Power station—East. The second sub-exit is identified and chosen because it is the closest and safest. The routing processor 26, 28 adds the portion to the route 48. Next, the routing processor 26, 28 identifies the next sub-exit labeled Storage 1 and adds this portion to the route 48. Finally, the routing processor 26, 28 adds the final portion of the route from sub-exit Storage 1 to the exit labeled Safe mustering zone—SW to complete the route. The final map 46 is as show in FIG. 5.

Figure 6:
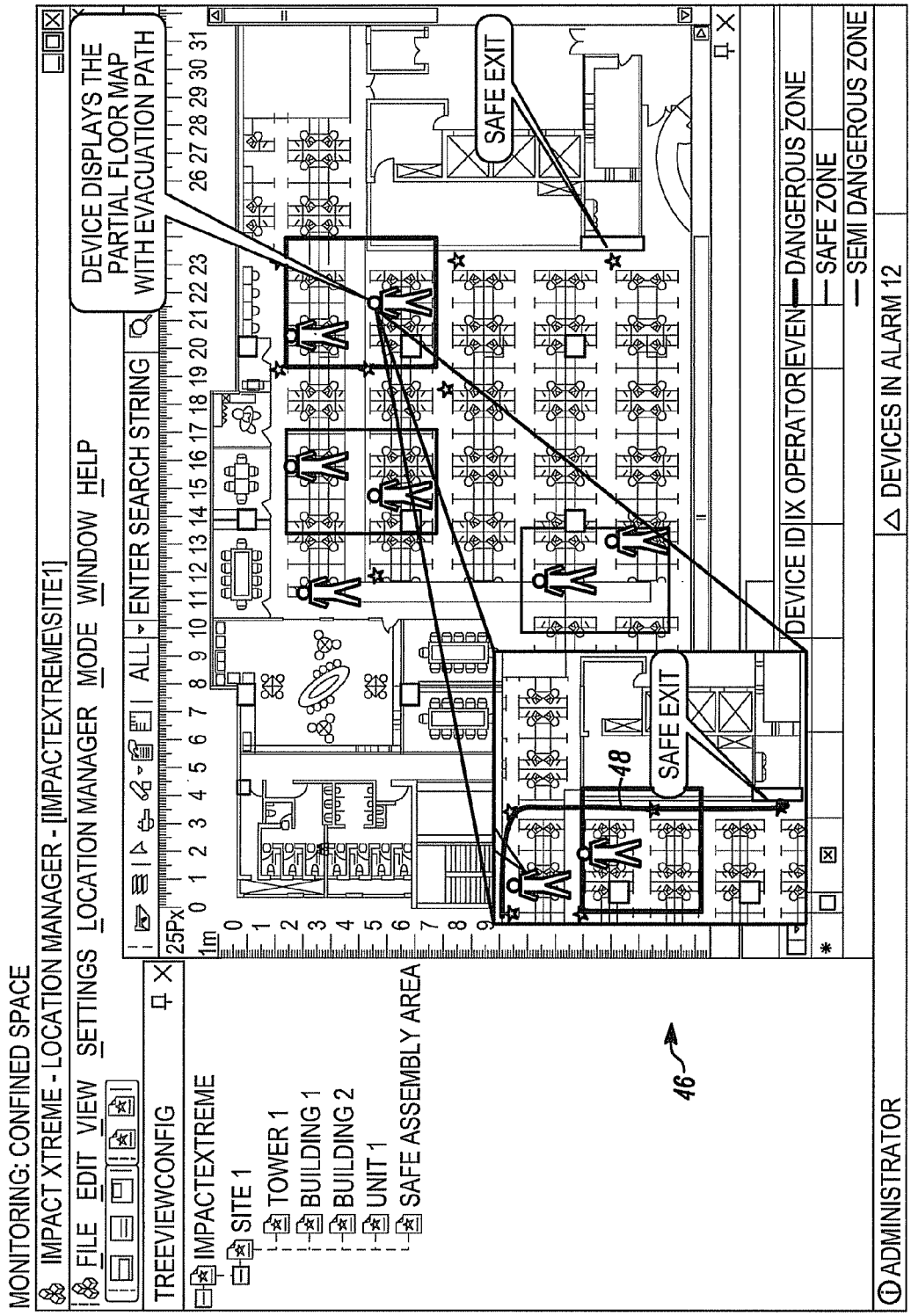
FIG. 6 depicts an example of a map and evacuation route for a closed area.

FIG. 6 shows a similar process occurring within a confined space. In this case, the dark squares define zones within a manufacturing area and the stars represent sub-exits.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
providing a central station and a plurality of environmental detectors within a protected area, each of the plurality of environmental detectors detecting environmental events within the protected area and reporting detected events to the central station;
one of the plurality of environmental detectors detecting an environmental event within the protected area and reporting that event to the central station;
the central station determining a location of the detected event and of each of the plurality of environmental detectors within the protected area;
the central station dynamically computing a route from the determined location of each of the plurality of environmental detectors to the closest and safest exit based upon the determined location of the detected event; and
the central station generating and sending a respective map showing the computed route to the closest and safest exit for that environmental detector to each of the plurality of environmental detectors and including displaying a location of first aid or personal protection equipment along the computed route to the closest and safest exit.

2. The method as in claim 1 further comprising the detecting environmental detector emitting an audio signal upon detecting the environmental event.

3. The method as in claim 1 further comprising another of the plurality of environmental detectors detecting the environmental event within the protected area and reporting that event to the central station, the central station dynamically re-computing a route from the determined location of each of the plurality of environmental detectors to the closest and safest exit based upon the determined locations of the detecting environmental detector and the other detecting environmental detectors.

4. The method as in claim 1 further comprising the central station measuring a signal strength of each of the plurality of environmental detectors from a plurality of signal measurement devices surrounding the environmental detector and triangulating the location of the environmental detector from the measured signal strengths.

5. The method as in claim 1 with at least some members of the plurality of environmental detectors determining their respective locations via GPS and sending a set of coordinates of each of the determined locations to the central station.

6. A system comprising:
   a central station; and
   a plurality of environmental detectors within a protected area, each of the plurality of environmental detectors configured to detect environmental events within the protected area and report detected events to the central station, wherein at least one of the plurality of environmental detectors detects an environmental event within the protected area and reports that event to the central station, the central station determines a location of the detected event and of each of the plurality of environmental detectors within the protected area, the central station dynamically computes a route from the determined location of each of the plurality of environmental detectors to the closest and safest exit based upon the determined location of the detected environmental event and the central station generates and sends a respective map showing the computed route to the closest and safest exit for that environmental detector to each of the plurality of environmental detectors and including displaying first aid or personal protection equipment depicted on the map along the computed route to the closest and safest exit.

7. The system of claim 6 further comprising an alarm within the detecting environmental detector that emits an audio signal upon detection of the environmental event.

8. The system of claim 6 further comprising another of the plurality of environmental detectors detecting an environmental event within the protected area and reporting that event to the central station, the central station dynamically re-computing a route from the determined location of each of the plurality of environmental detectors to the closest and safest exit based upon the determined locations of the detecting environmental detector and other detecting environmental detector.

9. The system of claim 6 further comprising a localizing processor within the central station that measures a signal strength of each of the environmental detectors from a plurality of signal measurement devices surrounding the environmental detectors and triangulates the location of the environmental detectors from the measured signal strengths.

10. The system of claim 6 further comprising a GPS device within at least one member of the plurality of environmental detectors that determines its location via GPS and sends a set of coordinates of the determined location to the central station.

11. A system comprising:
    a central station; and
    a plurality of environmental detectors within a protected area, each of the plurality of environmental detectors configured to detect environmental events within the protected area and report detected events to the central station;
    a localizing processor within the central station that receives a detected event from one of the plurality of environmental detectors and determines a location of the detected event and of each of the plurality of environmental detectors within the protected area, the localizing processor dynamically computes a route from the determined location of each of the plurality of environmental detectors to the closest and safest exit based upon the determined location of the detected environmental event; and
    a routing processor within the central station that generates and sends a respective map showing the computed route to the closest and safest exit for that environmental detector to each of the plurality of environmental detectors and including displaying first aid or personal protection equipment on the map along the computed route to the closest and safest exit.

12. The system of claim 11 wherein at least some members of the plurality of environmental detectors are adapted to attach to the clothing of persons in the protected area.

13. The system of claim 11 further comprising a gas sensor within each member of the plurality of environmental detectors that measures a gas concentration level.

14. The system of claim 11 further comprising one or more threshold values used to generate an alarm upon detecting that the measured gas concentration exceeds the threshold.

15. The system of claim 11 further comprising another member of the plurality of environmental detectors detecting the environmental event within the protected area and reporting that event to the central station, the central station dynamically re-computing a route from the determined location of each member of the plurality of environmental detectors to the closest and safest exit based upon the determined locations of the detecting environmental detector and the other detecting environmental detector.

16. The system of claim 11 wherein the localizing processor within the central station that measures a signal strength of the detecting environmental detector from a plurality of signal measurement devices surrounding the detecting environmental detector and triangulates the location of the detecting environmental detector from the measured signal strengths.

17. The system of claim 11 further comprising a GPS device within at least one member of the plurality of environmental detectors that determines its location via GPS and sends a set of coordinates of the determined location to the central station.

* * * * *